United States Patent
Maximets

(10) Patent No.: US 12,210,893 B2
(45) Date of Patent: Jan. 28, 2025

(54) ESTABLISHING PROCESS CONNECTIONS UTILIZING AN INTERMEDIARY BROKER

(71) Applicant: RED HAT, INC., Raleigh, NC (US)

(72) Inventor: Ilya Vladimirovich Maximets, Brno (CZ)

(73) Assignee: Red Hat, Inc., Raleigh, NC (US)

(*) Notice: Subject to any disclaimer, the term of this patent is extended or adjusted under 35 U.S.C. 154(b) by 461 days.

(21) Appl. No.: 17/388,390

(22) Filed: Jul. 29, 2021

(65) Prior Publication Data
US 2023/0032967 A1    Feb. 2, 2023

(51) Int. Cl.
G06F 9/455    (2018.01)
H04L 9/40    (2022.01)

(52) U.S. Cl.
CPC ........ *G06F 9/45558* (2013.01); *H04L 63/061* (2013.01); *G06F 2009/45587* (2013.01)

(58) Field of Classification Search
None
See application file for complete search history.

(56) References Cited

U.S. PATENT DOCUMENTS

| | | | |
|---|---|---|---|
| 5,341,363 A * | 8/1994 | Hirasawa | H04L 69/40 370/221 |
| 5,506,961 A * | 4/1996 | Carlson | G06F 21/85 709/229 |
| 5,657,390 A * | 8/1997 | Elgamal | H04L 9/40 713/151 |
| 6,256,115 B1 * | 7/2001 | Adler | H04N 1/32406 358/442 |
| 7,673,053 B1 * | 3/2010 | Foster | H04L 67/562 709/227 |
| 8,538,815 B2 * | 9/2013 | Mahaffey | G06Q 30/0242 705/14.66 |
| 8,850,547 B1 * | 9/2014 | Feeser | H04L 63/145 709/225 |
| 8,855,601 B2 * | 10/2014 | Grkov | G06F 21/88 455/410 |
| 9,042,876 B2 * | 5/2015 | Buck | H04W 12/126 455/418 |
| 9,674,892 B1 * | 6/2017 | Li | H04L 63/123 |
| 9,781,081 B1 * | 10/2017 | Wasiq | H04L 63/166 |
| 9,955,352 B2 * | 4/2018 | Mahaffey | H04W 12/30 |
| 10,389,704 B1 * | 8/2019 | Gupta | H04L 67/1097 |
| 10,642,694 B2 | 5/2020 | Mageswaran et al. | |

(Continued)

OTHER PUBLICATIONS

Kalin, M. (Apr. 17, 2019). "Inter-process communication in Linux: Sockets and signals," Opensource.com, pp. 15.

(Continued)

*Primary Examiner* — Adam Lee
(74) *Attorney, Agent, or Firm* — Womble Bond Dickinson (US) LLP

(57) ABSTRACT

A first request to establish a transport including a first key is received from a first client supported by a host system. A second request to establish the transport including a second key is received from a second client supported by the host system. A determination as to whether the first key matches the second key is made. In response to determining that the first key matches the second key, a first end point of the transport is provided to the first client and a second end point of the transport is provided to the second client.

20 Claims, 12 Drawing Sheets

(56) References Cited

U.S. PATENT DOCUMENTS

| | | | |
|---|---|---|---|
| 11,303,632 B1* | 4/2022 | Mannattil | H04L 63/0869 |
| 11,418,582 B1* | 8/2022 | Swain | H04L 67/145 |
| 11,489,775 B1* | 11/2022 | Sudhan | H04L 47/29 |
| 2001/0052012 A1* | 12/2001 | Rinne | H04L 47/2441 |
| | | | 709/224 |
| 2003/0033520 A1* | 2/2003 | Peiffer | H04L 9/40 |
| | | | 713/153 |
| 2004/0122953 A1* | 6/2004 | Kalmuk | G06F 16/2308 |
| | | | 709/227 |
| 2005/0086359 A1* | 4/2005 | Banerjee | G06F 9/5027 |
| | | | 709/232 |
| 2006/0029036 A1* | 2/2006 | Gassoway | H04L 67/133 |
| | | | 370/351 |
| 2006/0059265 A1* | 3/2006 | Keronen | H04L 63/0428 |
| | | | 709/228 |
| 2006/0129797 A1* | 6/2006 | Durfee | G06F 21/575 |
| | | | 713/2 |
| 2007/0061470 A1* | 3/2007 | Berg | H04L 67/1017 |
| | | | 709/227 |
| 2007/0133516 A1* | 6/2007 | Stein | H04L 47/2416 |
| | | | 370/395.2 |
| 2007/0224978 A1* | 9/2007 | Wherry | H04L 63/062 |
| | | | 455/414.2 |
| 2007/0245189 A1* | 10/2007 | Ono | G01R 31/2635 |
| | | | 714/724 |
| 2008/0098216 A1* | 4/2008 | Scovetta | H04N 7/162 |
| | | | 348/E7.06 |
| 2008/0148184 A1* | 6/2008 | Davis | G06F 3/04842 |
| | | | 715/810 |
| 2008/0248750 A1* | 10/2008 | Tsui | H02J 7/00302 |
| | | | 455/41.3 |
| 2009/0100349 A1* | 4/2009 | Hancock | H04L 63/0435 |
| | | | 713/150 |
| 2009/0113528 A1* | 4/2009 | Ananda | H04L 67/141 |
| | | | 726/5 |
| 2010/0272258 A1* | 10/2010 | Sadovsky | G06F 9/5027 |
| | | | 719/321 |
| 2011/0072501 A1* | 3/2011 | Fukui | H04L 63/101 |
| | | | 726/8 |
| 2011/0119491 A1* | 5/2011 | Nocera | H04W 8/186 |
| | | | 715/764 |
| 2011/0167263 A1* | 7/2011 | Cross | H04L 9/3268 |
| | | | 713/168 |
| 2012/0131323 A1* | 5/2012 | Gattegno | G06F 3/0635 |
| | | | 709/213 |
| 2013/0061047 A1* | 3/2013 | Sridharan | H04L 45/586 |
| | | | 718/1 |
| 2013/0291086 A1* | 10/2013 | Pontillo | H04L 63/0823 |
| | | | 726/10 |
| 2014/0223178 A1* | 8/2014 | Islam | G06F 21/31 |
| | | | 713/168 |
| 2014/0359353 A1* | 12/2014 | Chen | G06F 9/45558 |
| | | | 714/15 |
| 2015/0026681 A1* | 1/2015 | Lin | G06F 9/45533 |
| | | | 718/1 |
| 2016/0196158 A1* | 7/2016 | Nipane | G06F 9/45558 |
| | | | 718/1 |
| 2016/0226835 A1* | 8/2016 | Hamburger | G06F 15/167 |
| 2016/0306949 A1* | 10/2016 | Tallapaneni | H04W 12/0431 |
| 2016/0330076 A1* | 11/2016 | Tiwari | H04L 41/0806 |
| 2017/0230349 A1* | 8/2017 | Gaur | G06F 21/629 |
| 2017/0265238 A1* | 9/2017 | Li | H04W 48/16 |
| 2017/0272948 A1* | 9/2017 | Holtmanns | H04W 12/06 |
| 2017/0295168 A1* | 10/2017 | Wan | H04L 63/0876 |
| 2017/0339234 A1* | 11/2017 | Vajravel | H04L 67/145 |
| 2017/0346885 A1* | 11/2017 | Jiang | H04L 45/7453 |
| 2018/0309718 A1* | 10/2018 | Zuo | H04L 61/2521 |
| 2018/0332003 A1* | 11/2018 | Deriso | H04L 63/0823 |
| 2019/0141097 A1* | 5/2019 | Shang | H04L 67/10 |
| 2019/0319958 A1* | 10/2019 | Ocher | H04L 63/18 |
| 2020/0112555 A1* | 4/2020 | Brown | H04L 63/083 |
| 2020/0153682 A1* | 5/2020 | Nidumolu | G06F 9/4416 |
| 2020/0252489 A1* | 8/2020 | Hooker | H04L 69/163 |
| 2020/0314064 A1* | 10/2020 | Lee | H04L 63/1441 |
| 2020/0374136 A1* | 11/2020 | Momchilov | H04L 9/0819 |
| 2021/0181720 A1* | 6/2021 | Ratilla | G05B 19/0426 |
| 2021/0209068 A1* | 7/2021 | Appireddygari Venkataramana | G06F 11/1466 |
| 2021/0281561 A1* | 9/2021 | Burugula | H04L 63/0823 |
| 2022/0012110 A1* | 1/2022 | Dhillon | G06F 9/547 |
| 2022/0030300 A1* | 1/2022 | Periyaeluvan | H04N 21/44231 |
| 2022/0159462 A1* | 5/2022 | Zhao | H04W 76/10 |
| 2022/0182278 A1* | 6/2022 | Vangapalli | H04L 41/0631 |

OTHER PUBLICATIONS

Moffatt, R. (2020). "My Python/Java/Spring/Go/Whatever Client Won't Connect to My Apache Kaka Cluster in Docker/AWS/My Brother's Laptop. Please Help!" Troubleshoot Connectivity, pp. 35.

"How to get Docker containers to talk to each other while running on my local host?" (2019) Stack Overflow, pp. 3.

* cited by examiner

ESTABLISHING PROCESS CONNECTIONS UTILIZING AN INTERMEDIARY BROKER

TECHNICAL FIELD

Aspects of the present disclosure relate to establishing network connections, and more particularly, to establishing process connections utilizing an intermediary broker.

BACKGROUND

A virtual machine (VM) is a portion of software that, when executed on appropriate hardware, creates an environment allowing the virtualization of an actual physical computer system (e.g., a server, a mainframe computer, etc.). The actual physical computer system is typically referred to as a "host machine," and the operating system (OS) of the host machine is typically referred to as the "host operating system." Typically, software on the host machine known as a "hypervisor" (or a "virtual machine monitor") manages the execution of one or more virtual machines or "guests", providing a variety of functions such as virtualizing and allocating resources, context switching among virtual machines, etc. The operating system (OS) of the virtual machine is typically referred to as the "guest operating system."

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments without departing from the spirit and scope of the described embodiments.

DETAILED DESCRIPTION

Figure 1:
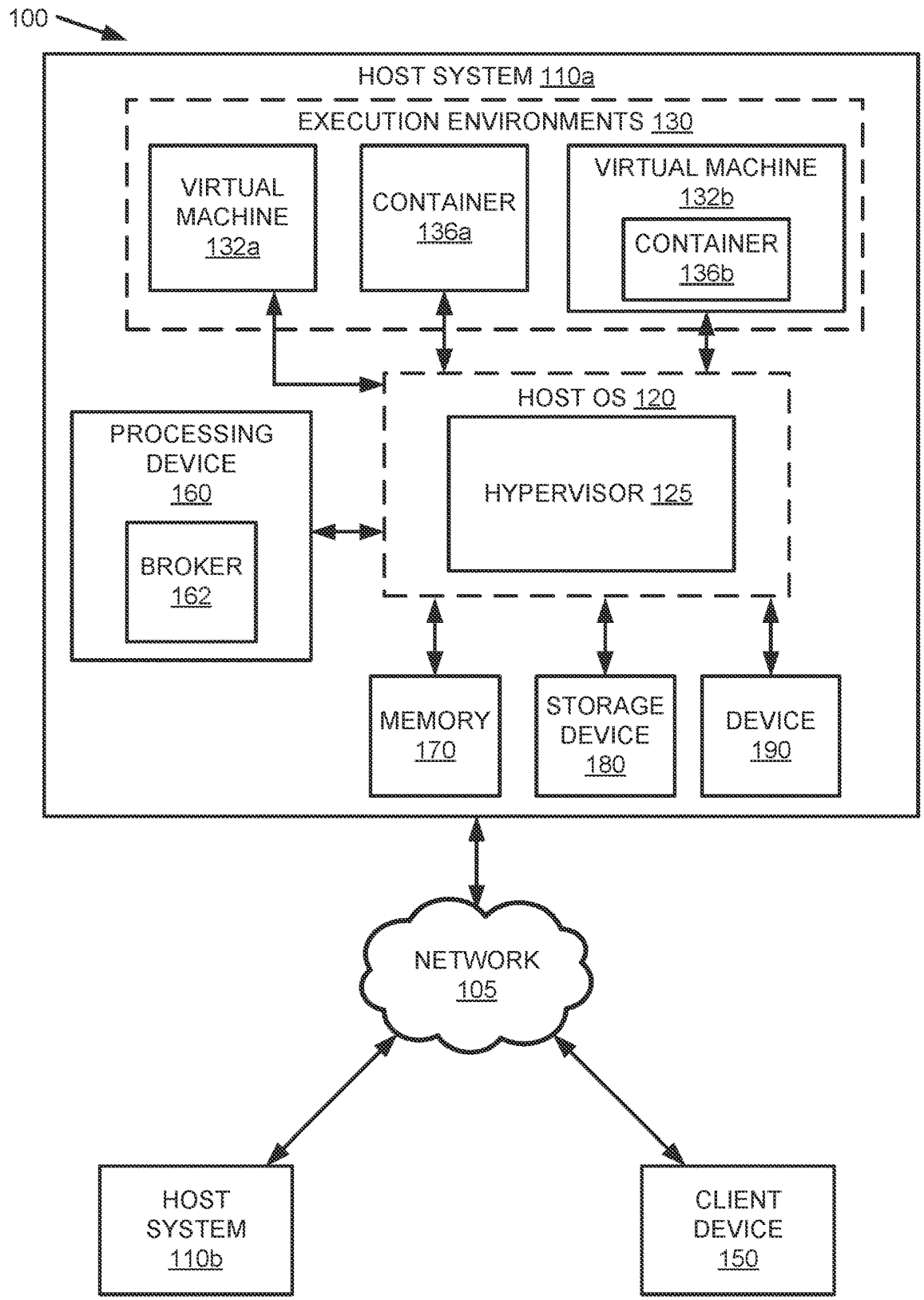
FIG. 1 is a block diagram that illustrates an example computing architecture, in accordance with some embodiments.

In a virtualization architecture, transports (also referred to as "connections" hereafter) are used to connect different applications and/or execution environments on a host system to facilitate communication. The communication between the different applications may be routed via a virtual switch executed by a processing device of the host system. To enable communication between these applications, a hypervisor or virtual machine manager may first establish and configure the connections between the applications. In some embodiments, the connections may use sockets, such as UNIX™ domain sockets, to facilitate the communication.

In a conventional virtualization architecture, a host system may support a number virtual machines and/or containers that are executing different applications (also referred to as "clients" hereafter). To establish a connection between these applications, processing logic of the host system may utilize a socket as a transport and define two roles, a "master" role and a "slave" role as part of a user protocol that uses sockets as a transport. The "master" role and the "slave" role can either be the server/host system (e.g., the entity that creates the socket) or the client (e.g., the entity that connects to the existing socket). In some embodiments, the processing logic may designate the client as the "master" and a virtual switch of the host system as the "slave." In such an embodiment, a disconnection requires the "master" to be restarted in order to re-establish communication. For example, in the case of a disconnection, the client (e.g., the "master"), such as a virtual machine or container, may need to be restarted in order to re-establish the connection, decreasing the performance of the virtualization architecture. If the "master" role is the host system and the "slave" role is the client then such a restart is not needed. However, in a conventional virtualization architecture, it may be inconvenient or undesirable for a user to utilize such an embodiment.

Aspects of the disclosure address the above-noted and other deficiencies by utilizing an intermediary broker to establish process connections in a host system. The broker may be executed by processing logic of a processing device of a host system that supports multiple execution environments. In embodiments, an execution environment may be a virtual machine. In some embodiments, an execution environment may be a container. The broker may create a single socket that is used to communicate with the clients, such as execution environments and virtual switches, of the host system.

To establish a connection for an execution environment, a virtual switch of the host system may receive a command to generate a virtual port to be used by the execution environment. The command may also include a key that is associated with the virtual port. In embodiments, the key may correspond to a stream or sequence of bytes. Upon receiving the command, the virtual switch may generate the virtual port, transmit the key associated with the virtual port to the broker via the broker socket, and wait for an end point for the connection. In embodiments, the virtual switch may have multiple virtual ports, each with a corresponding key, that have been generated for different execution environments of the host system.

When the execution environment is instantiated by the host system, the execution environment may receive a key that matches the key associated to with the virtual port at the virtual switch. After the execution environment has been instantiated and is running on the host system, the execution environment may transmit a request to establish a connection to the broker via the broker socket. The request may include the key that was received by the execution environment during instantiation. The broker may then compare the key received from the execution environment to any keys provided by the virtual switch (which are each associated with a corresponding virtual port) to determine whether there is a match. Upon determining that the key of the execution environment matches a key provided by the virtual switch, the broker may provide connection end points to the virtual switch and the execution environment to establish communication between the execution environment and the corresponding virtual port of the virtual switch. By utilizing an intermediary broker, a host system may be able to generate fast, reliable connections between clients of the host system, improving the performance of the virtualization architecture.

FIG. 1 depicts a high-level component diagram of an illustrative example of a computing architecture 100, in accordance with one or more aspects of the present disclosure. However, other computing architectures 100 are possible, and the implementation of a computer system utilizing examples of the disclosure are not necessarily limited to the specific architecture depicted by FIG. 1.

As shown in FIG. 1, computing architecture 100 includes host systems 110a, b and client device 150. The host systems 110a, b and client device 150 include one or more processing devices 160, memory 170, which may include volatile memory devices (e.g., random access memory (RAM)), non-volatile memory devices (e.g., flash memory) and/or other types of memory devices, a storage device 180 (e.g., one or more magnetic hard disk drives, a Peripheral Component Interconnect [PCI] solid state drive, a Redundant Array of Independent Disks [RAID] system, a network attached storage [NAS] array, etc.), and one or more devices 190 (e.g., a Peripheral Component Interconnect [PCI] device, network interface controller (NIC), a video card, an I/O device, etc.). In certain implementations, memory 170 may be non-uniform access (NUMA), such that memory access time depends on the memory location relative to processing device 160. It should be noted that although, for simplicity, a single processing device 160, storage device 180, and device 190 are depicted in FIG. 1, other embodiments of host systems 110a, b and client device 150 may include multiple processing devices, storage devices, or devices. Processing device 160 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 160 may also include one or more special-purpose processing devices such as an application specific integrated circuit (ASIC), a field programmable gate array (FPGA), a digital signal processor (DSP), network processor, or the like.

The host systems 110a, b and client device 150 may be a server, a mainframe, a workstation, a personal computer (PC), a mobile phone, a palm-sized computing device, etc. In embodiments, host systems 110a, b and client device 150 may be separate computing devices. In some embodiments, host systems 110a, b and client device 150 may be implemented by a single computing device. For clarity, some components of host system 110b and client device 150 are not shown. Although computing architecture 100 is illustrated as having two host systems, embodiments of the disclosure may utilize any number of host systems.

Host systems 110a, b may additionally include execution environments 130, which may include one or more virtual machines (VMs) 132a, containers 136a, containers 136b residing within virtual machines 132b, and host operating system (OS) 120. VM 132a and VM 132b are software implementations of machines that execute programs as though they were actual physical machines. Container 136 acts as isolated execution environments for different workloads of services, as previously described. Host OS 120 manages the hardware resources of the computer system and provides functions such as inter-process communication, scheduling, memory management, and so forth.

Host OS 120 may include a hypervisor 125 (which may also be known as a virtual machine monitor (VMM)), which provides a virtual operating platform for VMs 132a, b and manages their execution. Hypervisor 125 may manage system resources, including access to physical processing devices (e.g., processors, CPUs, etc.), physical memory (e.g., RAM), storage device (e.g., HDDs, SSDs), and/or other devices (e.g., sound cards, video cards, etc.). The hypervisor 125, though typically implemented in software, may emulate and export a bare machine interface to higher level software in the form of virtual processors and guest memory. Higher level software may comprise a standard or real-time OS, may be a highly stripped down operating environment with limited operating system functionality, and/or may not include traditional OS facilities, etc. Hypervisor 125 may present other software (i.e., "guest" software) the abstraction of one or more VMs that provide the same or different abstractions to various guest software (e.g., guest operating system, guest applications). It should be noted that in some alternative implementations, hypervisor 125 may be external to host OS 120, rather than embedded within host OS 120, or may replace host OS 120.

The host systems 110a, b and client device 150 are coupled to each other (e.g., may be operatively coupled, communicatively coupled, may communicate data/messages with each other) via network 105. Network 105 may be a public network (e.g., the internet), a private network (e.g., a local area network (LAN) or wide area network (WAN)), or a combination thereof. In one embodiment, network 105 may include a wired or a wireless infrastructure, which may be provided by one or more wireless communications systems, such as a WiFi™ hotspot connected with the network 105 and/or a wireless carrier system that can be implemented using various data processing equipment, communication towers (e.g., cell towers), etc. The network 105 may carry communications (e.g., data, message, packets, frames, etc.) between the various components of host systems 110a, b and client device 150.

In embodiments, processing device 160 may execute a broker 162. The broker 162 may act as an intermediary to establish transports between clients of host system 110a. The broker 162 may perform key comparisons to determine how to configure the transports between the clients. Further details regarding broker 162 will be discussed at FIGS. 2-11 below.

Figure 2:
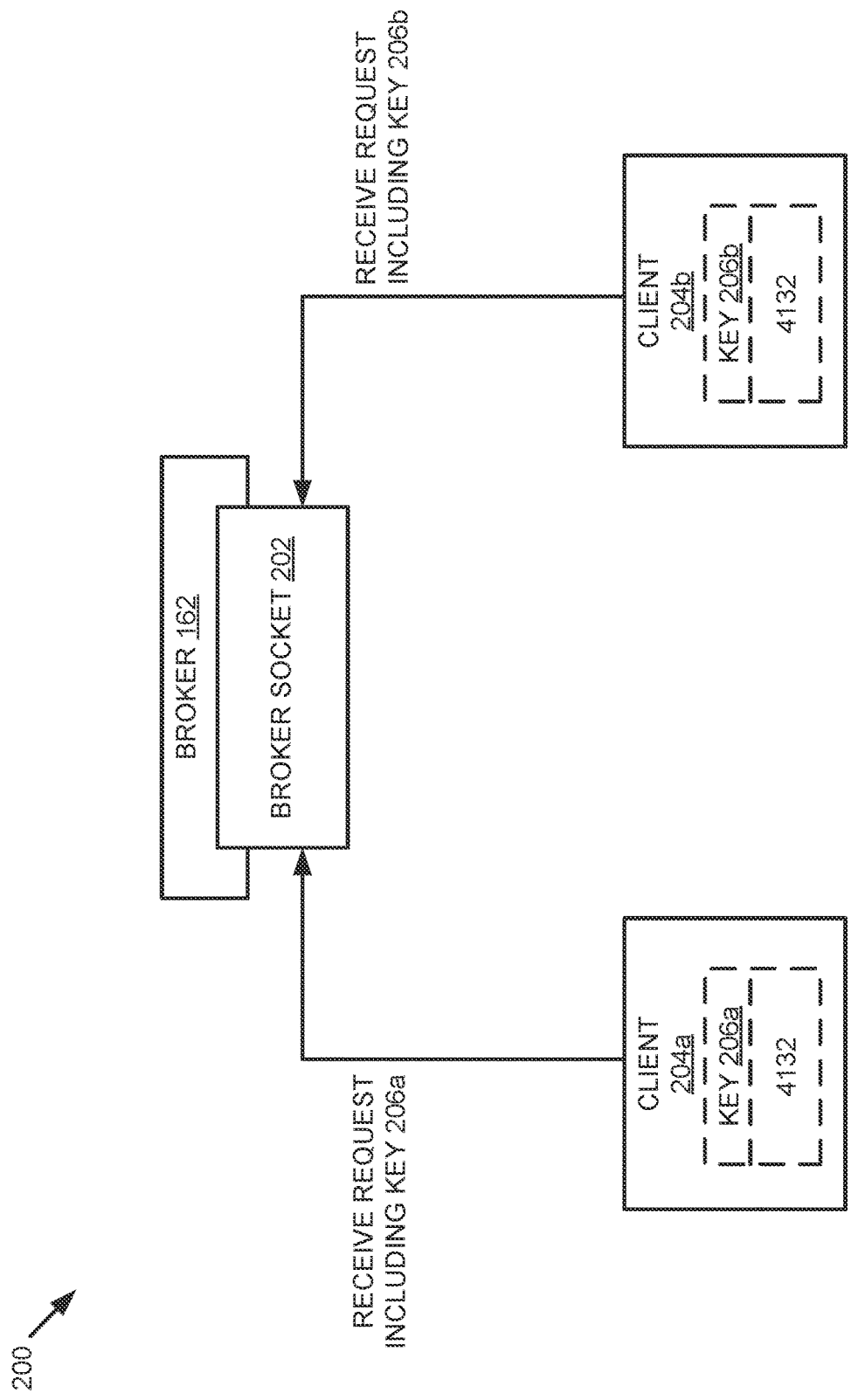
FIG. 2 is an illustration of an example of a broker of a host system receiving requests to establish a transport, in accordance with embodiments of the disclosure.

FIG. 2 is an illustration of an example of a broker of a host system 200 receiving requests to establish a transport, in accordance with embodiments of the disclosure. The host system 200 may correspond to host system 110a of FIG. 1. The host system 200 includes a broker 162 having a broker socket 202, client 204a, and client 204b. Client 204a has a corresponding key 206a and client 204b has a corresponding key 206b. As previously described, key 206a and key 206b may be streams or sequences of bytes. In embodiments, the streams or sequences of bytes may be randomly or pseudo-randomly generated.

Broker socket 202 may act as a communication interface that facilitates communication between broker 162 and client 204a, as well as between broker 162 and client 204b. Because a transport has not yet been established between client 204a and client 204b, client 204a may be unable to communicate with client 204b. Although a single client pair (e.g., client 204a and client 204b) is shown in FIG. 2, host system may include any number of client pairs, which may use the broker socket 202 to communicate with broker 162. In some embodiments, client 204a and client 204b may correspond to a virtual switch, a virtual machine, a container, or any combination thereof. As previously described, one or more of client 204a or client 204b may be executing one or more applications. To establish a transport between client 204a and client 204b, client 204a may transmit a first request to broker 162 to establish the transport that includes key 206a. Client 204b may transmit a second request to broker 162 that includes key 206b.

Figure 3:
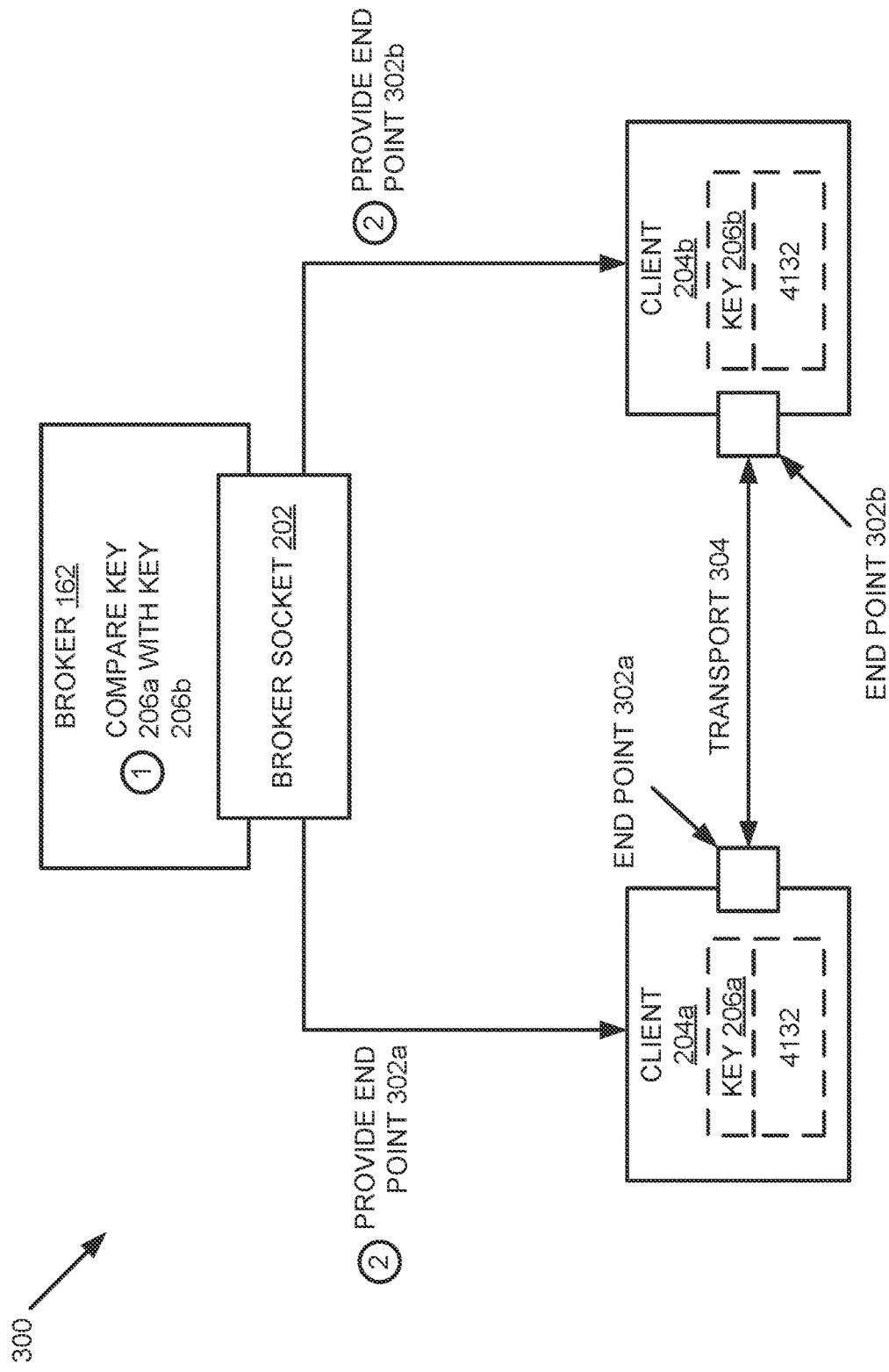
FIG. 3 is an illustration of an example of a broker of a host system establishing a transport between clients, in accordance with embodiments of the disclosure.

FIG. 3 is an illustration of an example of a broker of a host system 300 establishing a transport between clients, in accordance with embodiments of the disclosure. In FIG. 3, broker 162 has received the requests from client 204a and client 204b including key 206a and key 206b, respectively. Upon receiving the requests including the keys, the broker may perform a key comparison to compare key 206a with key 206b. If key 206a and key 206b match, then broker 162 may establish the transport 304 between client 204a and client 204b by providing end point 302a to client 204a and end point 302b to client 204b.

End point 302a and end point 302b may correspond to communication interfaces that enable the corresponding clients (e.g., client 204a and client 204b) to communicate via transport 304. In some embodiments, end point 302a and end point 302b may correspond to sockets of a socket pair of transport 304. Transport 304 may correspond to network connection that facilitates the transmission of data between client 204a and client 204b. In some embodiments, transport 304 may be a transport that supports the transferring of file descriptors. A file descriptor may be a handle that is used in an interface between user and kernel space of host system 300 to identify file/socket resources.

Referring to FIG. 3, upon receiving the requests, broker 162 may compare the sequence of bytes for key 206a and key 206b to determine whether key 206a and key 206b match. Because the sequence of byes for key 206a (e.g., 4132) matches the sequence of bytes for key 206b (e.g., 4132), the broker 162 may provide end point 302a to client 204a and end point 302b to client 204b to establish transport 304b between client 204a and client 204b. Upon receiving the end points and establishing transport 304, client 204a and client 204b may be able to communicate and transmit data via transport 304.

Figure 4:
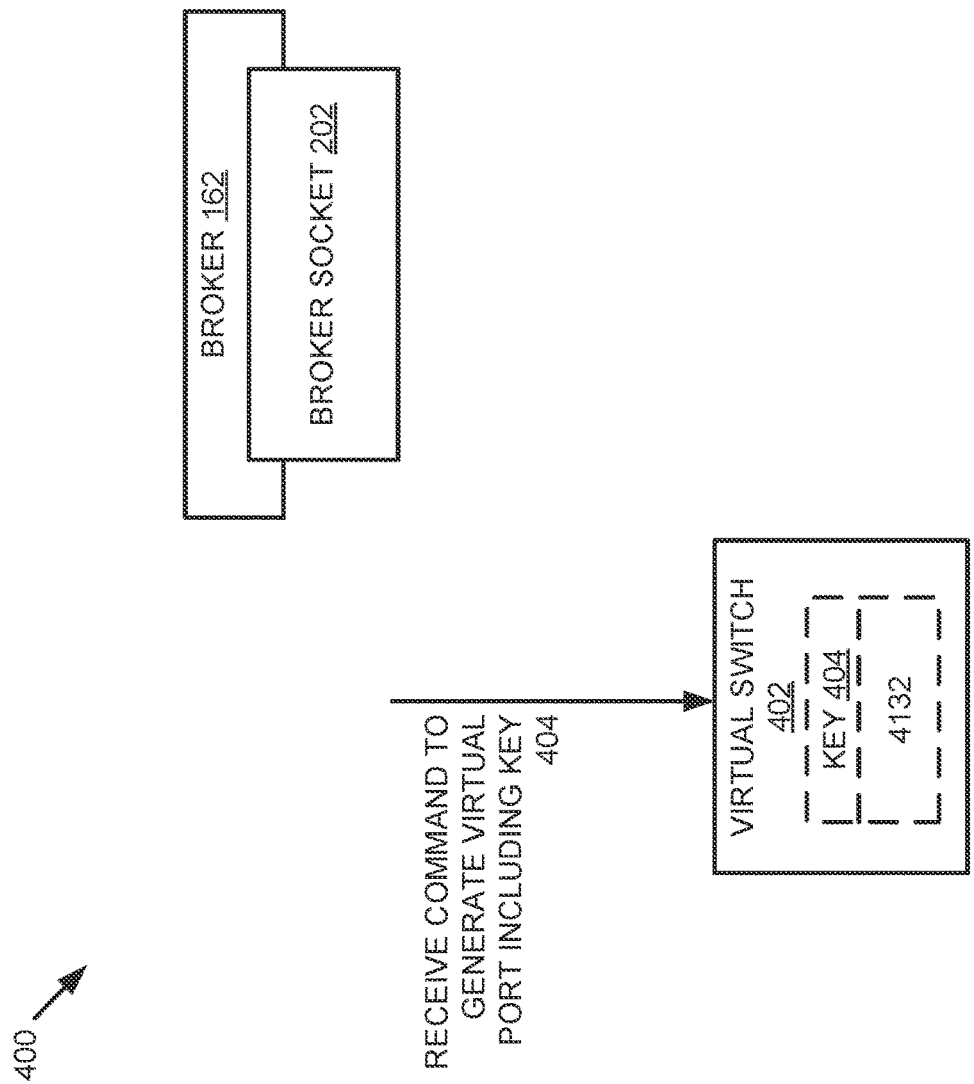
FIG. 4 is an illustration of an example of a virtual switch of a host system receiving a command to generate a virtual port including a key, in accordance with embodiments of the disclosure.

FIG. 4 is an illustration of an example of a virtual switch of a host system 400 receiving a command to generate a virtual port including a key, in accordance with embodiments of the disclosure. The host system 400 may correspond to host system 110a of FIG. 1. Host system 400 includes broker 162 having a broker socket 202 and a virtual switch 402. Virtual switch 402 may correspond to an application executed by a processing device (not shown) of host system 400 that facilitates the communication between execution environments (e.g., execution environments 130) of host system 400. The virtual switch 402 may communicate with the execution environments via virtual ports, where each execution environment has a corresponding virtual port.

To ensure that a virtual port is available for an instantiated execution environment on host system 400, a command to generate a virtual port is transmitted to virtual switch 402 that includes key 404. In some embodiments, the command may be transmitted by a user/administrator of host system 400. In embodiments, the command may be received from a hypervisor (e.g., hypervisor 125). In an embodiment, the command may be received from a container/cluster management system. Upon receiving the command, the virtual switch 402 may generate a virtual port and associate the virtual port with key 404. In some embodiments, transmit one or more commands may be transmitted to virtual switch 402 to generate multiple virtual ports, where each of the multiple virtual ports has a different corresponding key. In embodiments, upon generating the virtual port, the virtual switch may transmit a request to establish a transport including key 404 to broker 162, as previously described.

Figure 5:
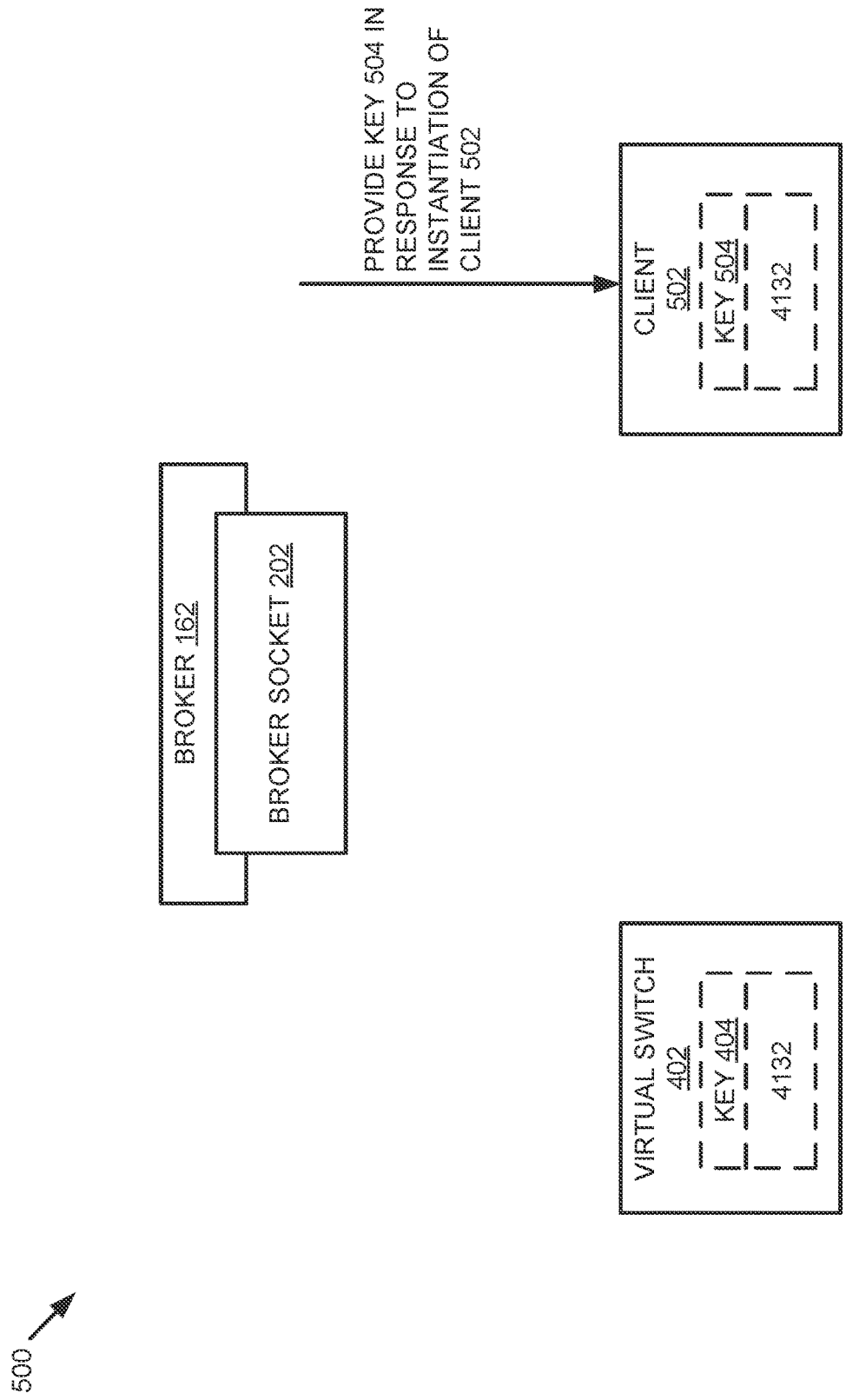
FIG. 5 is an illustration of an example of a client of a host system receiving a key in response to an instantiation of the client, in accordance with embodiments of the disclosure.

FIG. 5 is an illustration of an example of a client of a host system 500 receiving a key in response to an instantiation of the client, in accordance with embodiments of the disclosure. In FIG. 5, client 502 may be a virtual machine or container that has been instantiated on host system 500. Upon detecting the instantiation of client 502, the entity that instantiates client 502 may transmit key 504 that matches key 404 to client 502 so that a transport may be subsequently established using the virtual port associated with key 404 at the virtual switch 402. In some embodiments, the entity that instantiates client 502 may be a user/administrator of host system 500. In embodiments, the entity may be a hypervisor (e.g., hypervisor 125). In an embodiment, the entity may be a container/cluster management system.

Figure 6:
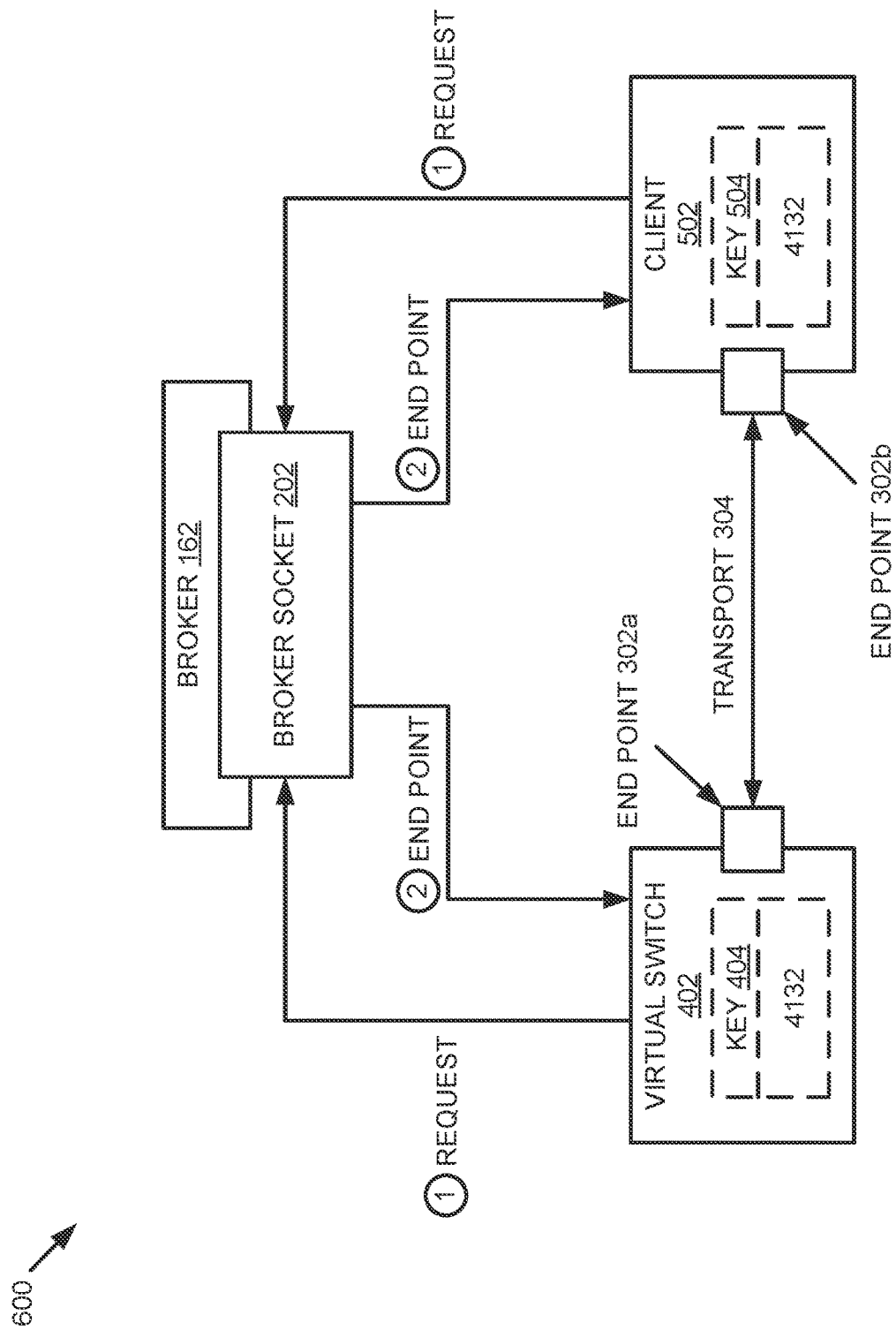
FIG. 6 is an illustration of an example of a broker of a host system establishing a transport between a client and a virtual switch, in accordance with embodiments of the disclosure.

FIG. 6 is an illustration of an example of a broker of a host system 600 establishing a transport between a client and a virtual switch, in accordance with embodiments of the disclosure. In FIG. 6, virtual switch 402 may transmit a first request to establish transport 304 that includes key 404 to broker 162 and client 502 may transmit a second request to establish transport 304 that includes key 504. In some embodiments, the virtual switch 402 may transmit the request upon generating the virtual port associated with key 404. In embodiments, the client 502 may transmit the request in response to the completion of a startup of client 502.

Upon receiving the requests, the broker 162 may determine whether key 404 matches key 504. In some embodiments, the broker 162 may include a data structure that includes multiple keys received from different clients of the host system. Upon receiving a request including a key, the broker 162 may query the data structure to determine whether any of the keys included in the data structure match the key received with the request. For example, upon receiving the request from the virtual switch 402 that includes key 404, the broker 162 may add the key 404 associated with virtual switch 402. Upon receiving the request from client 502 including key 504, the broker 162 may query the data structure and identify key 404 in the data structure that matches key 504. Upon determining that key 404 matches key 504, the broker 162 may provide end point 302a to virtual switch 402 and end point 302b to client 502 to establish transport 304 between virtual switch 402 and client 502, as previously described.

Figure 7:
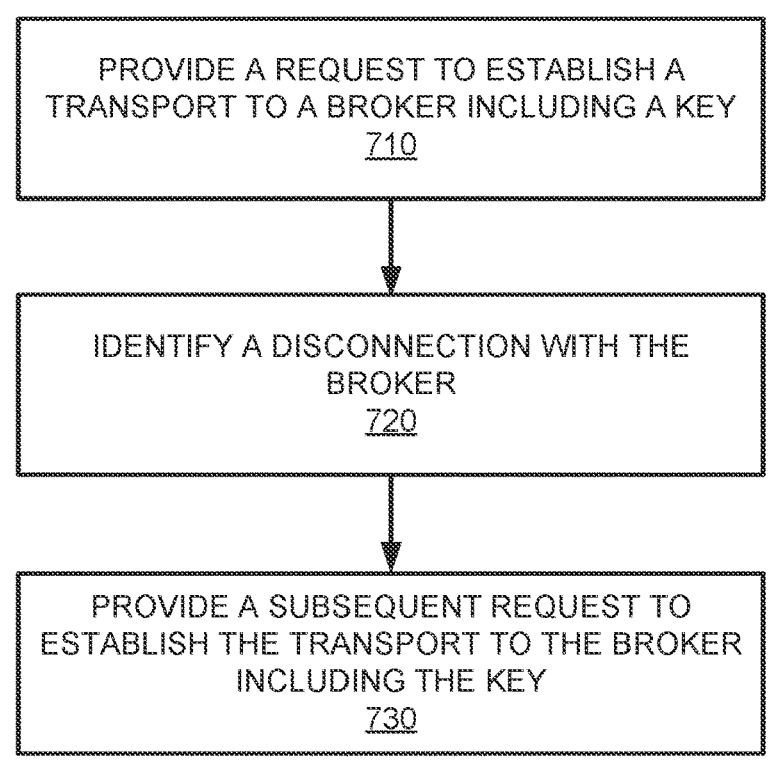
FIG. 7 is a flow diagram of a method of transmitting a subsequent request to establish a transport in response identifying a disconnection with a broker, in accordance with some embodiments.

FIG. 7 is a flow diagram of a method 700 of transmitting a subsequent request to establish a transport in response identifying a disconnection with a broker, in accordance with some embodiments. Method 800 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 700 may be performed by processing device 160 executing a client, such as client 204a of FIG. 2.

With reference to FIG. 7, method 700 illustrates example functions used by various embodiments. Although specific function blocks ("blocks") are disclosed in method 700, such blocks are examples. That is, embodiments are well suited to performing various other blocks or variations of the blocks recited in method 700. It is appreciated that the blocks in method 700 may be performed in an order different than presented, and that not all of the blocks in method 700 may be performed.

Method 700 begins at block 710, where the processing logic provides a request to establish a transport to a broker that includes a key.

At block 720, the processing logic identifies a disconnection with the broker. The processing logic may identify that a network connection between the client and the broker via a broker socket is no longer transmitting data.

At block 730, upon identifying the disconnection with the broker, the processing logic may provide a subsequent request to establish the transport to the broker that includes the key.

Figure 8:
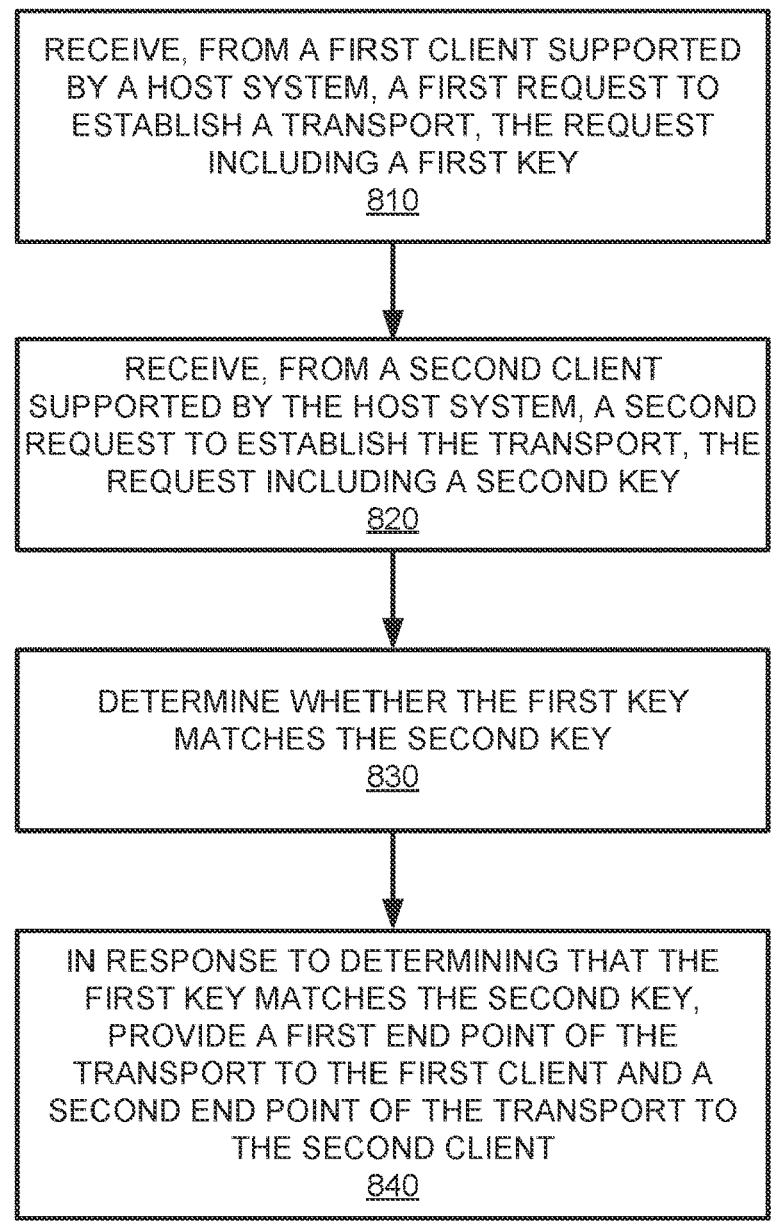
FIG. 8 is a flow diagram of a method of establishing a transport between clients supported by a host system, in accordance with some embodiments.

FIG. 8 is a flow diagram of a method 800 of establishing a transport between clients supported by a host system, in accordance with some embodiments. Method 800 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 800 may be performed by broker 162 of FIG. 1.

With reference to FIG. 8, method 800 illustrates example functions used by various embodiments. Although specific function blocks ("blocks") are disclosed in method 800, such blocks are examples. That is, embodiments are well suited to performing various other blocks or variations of the blocks recited in method 800. It is appreciated that the blocks in method 800 may be performed in an order different than presented, and that not all of the blocks in method 800 may be performed.

Method 800 begins at block 810, where the processing logic receives, from a first client supported by a host system, a first request to establish a transport that includes a first key.

At block 820, the processing logic receives, from a second client supported by the host system, a second request to establish the transport that includes a second key.

At block 830, the processing logic determines whether the first key matches the second key. At block 840, in response to determining that the first key matches the second key, the processing logic provides a first end point of the transport to the first client and a second end point of the transport to the second client.

Figure 9:
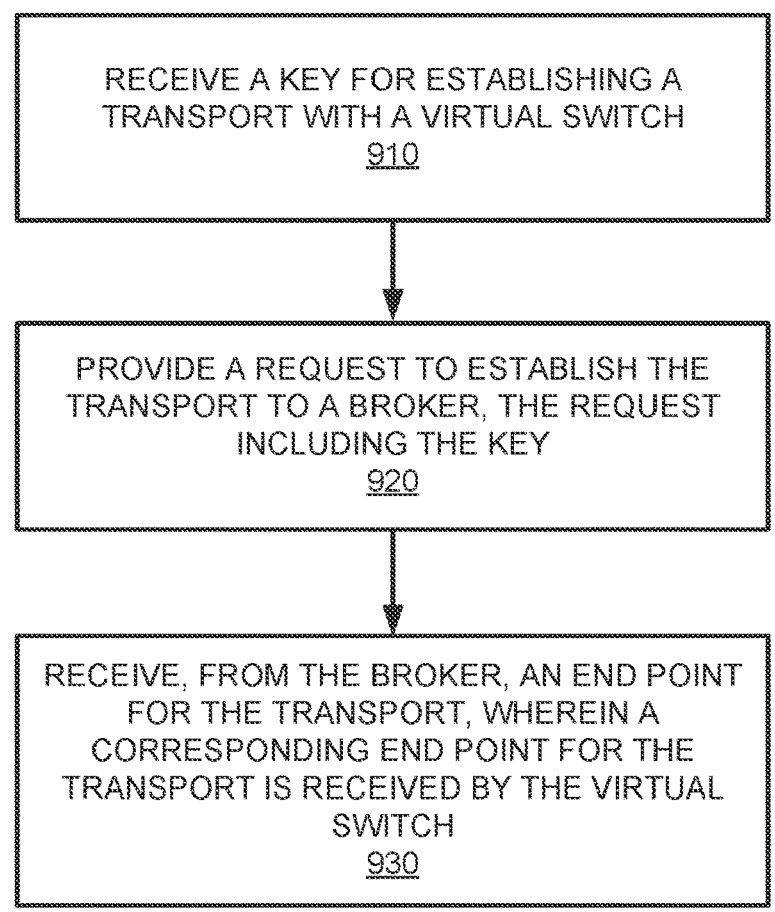
FIG. 9 is a flow diagram of a method of establishing a transport between a client and a virtual switch, in accordance with some embodiments.

FIG. 9 is a flow diagram of a method 900 of establishing a transport between a client and a virtual switch, in accordance with some embodiments. Method 900 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 900 may be performed by processing device 160 executing a client, such as client 204a of FIG. 2.

With reference to FIG. 9, method 900 illustrates example functions used by various embodiments. Although specific function blocks ("blocks") are disclosed in method 900, such blocks are examples. That is, embodiments are well suited to performing various other blocks or variations of the blocks recited in method 900. It is appreciated that the blocks in method 900 may be performed in an order different than presented, and that not all of the blocks in method 900 may be performed.

Method 900 begins at block 910, where the processing logic receives a key for establishing a transport with a virtual switch.

At block 920, the processing logic provides a request to establish the transport to a broker that includes the key.

At block 930, the processing logic receives, from the broker, and end point for the transport. A corresponding end point for the transport may be received by the virtual switch, as previously described.

Figure 10:
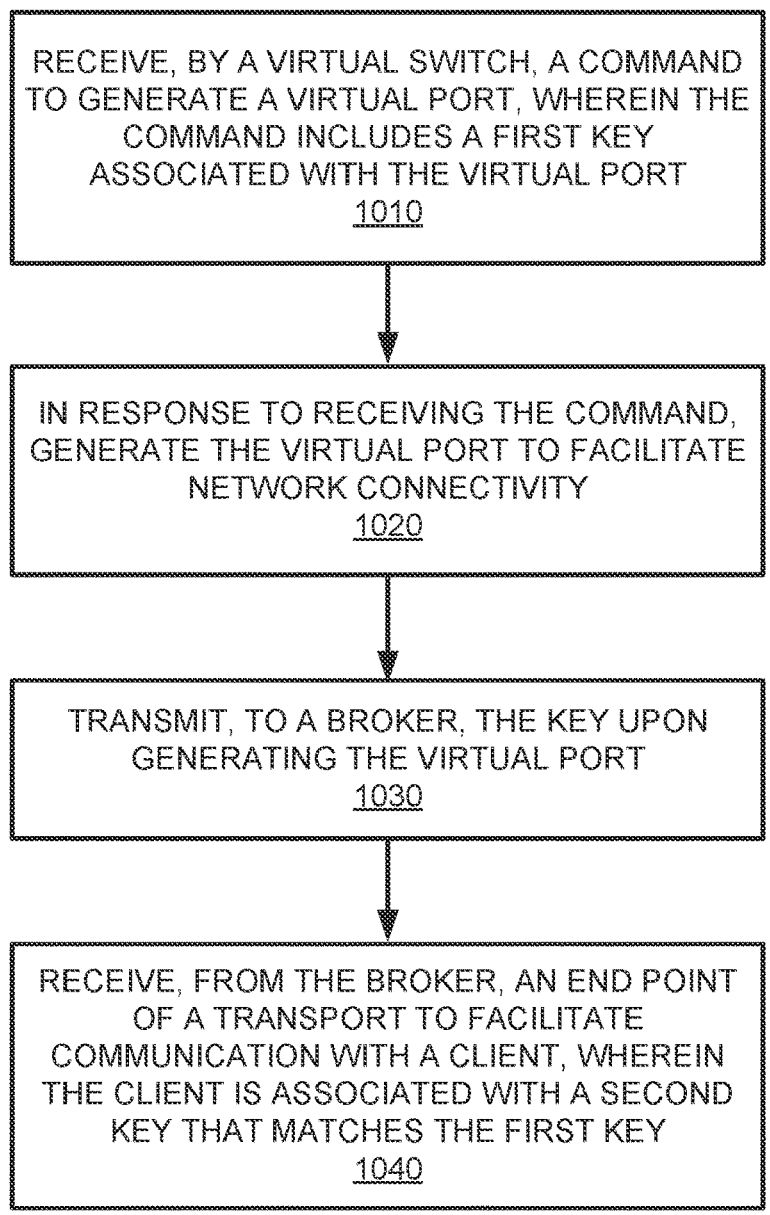
FIG. 10 is a flow diagram of a method of a virtual switch generating a virtual port associated with a received key, in accordance with some embodiments.

FIG. 10 is a flow diagram of a method 1000 of a virtual switch generating a virtual port associated with a received key, in accordance with some embodiments. Method 1000 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 1000 may be performed by processing device 160 executing a virtual switch, such as virtual switch 402 of FIG. 4.

With reference to FIG. 10, method 1000 illustrates example functions used by various embodiments. Although specific function blocks ("blocks") are disclosed in method 1000, such blocks are examples. That is, embodiments are well suited to performing various other blocks or variations of the blocks recited in method 1000. It is appreciated that the blocks in method 1000 may be performed in an order different than presented, and that not all of the blocks in method 1000 may be performed.

Method 1000 begins at block 1010, where the processing logic receives, by a virtual switch, a command to generate a virtual port, wherein the command includes a first key associated with the virtual port.

At block 1020, in response to receiving the command, the processing logic generates the virtual port to facilitate network connectivity.

At block 1030, the processing logic transmits, to a broker, the key upon generating the virtual port.

At block 1040, the processing logic receives, from the broker, an endpoint of a transport to facilitate communication with a client. The client may be associated with a second key that matches the first key, as previously described.

Figure 11:
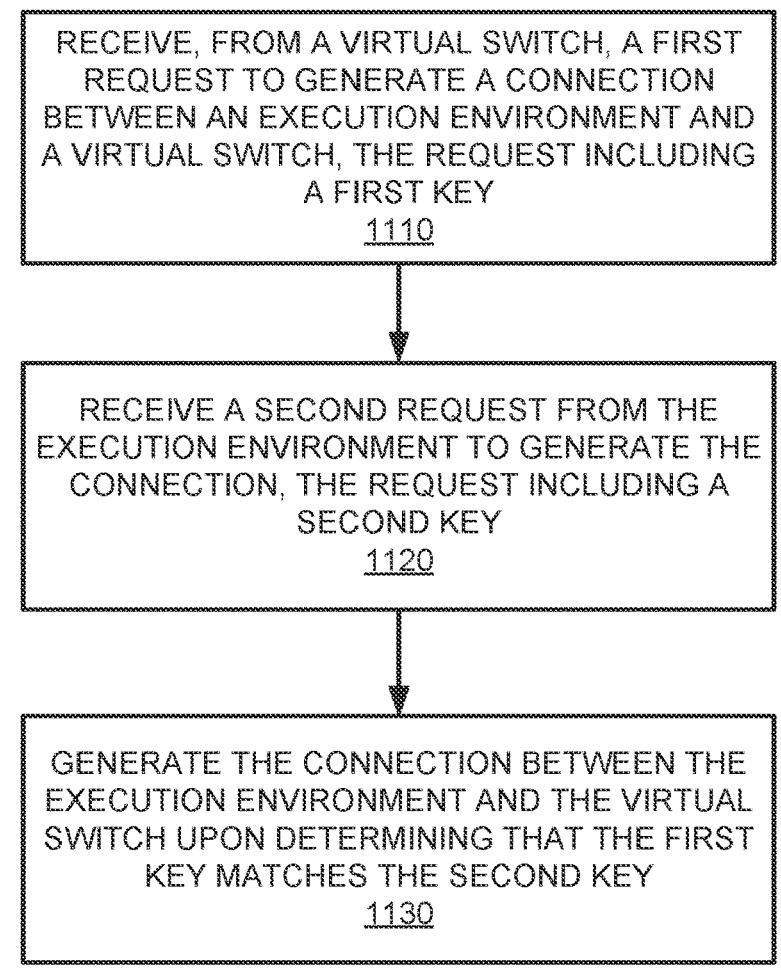
FIG. 11 is a flow diagram of a method of generating a connection between a virtual switch and an execution environment, in accordance with some embodiments.

FIG. 11 is a flow diagram of a method 1100 of generating a connection between a virtual switch and an execution environment, in accordance with some embodiments. Method 1100 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 1100 may be performed by broker 162 of FIG. 1.

With reference to FIG. 11, method 1100 illustrates example functions used by various embodiments. Although specific function blocks ("blocks") are disclosed in method 1100, such blocks are examples. That is, embodiments are well suited to performing various other blocks or variations of the blocks recited in method 1100. It is appreciated that the blocks in method 1100 may be performed in an order different than presented, and that not all of the blocks in method 1100 may be performed.

Method 1100 begins at block 1110, where the processing logic receives, from a virtual switch, a first request to generate a connection between an execution environment and a virtual switch that includes a first key.

At block 1120, the processing logic receives a second request from the execution environment to generate the connection that includes a second key.

At block 1130, the processing logic generates the connection between the execution environment and the virtual switch upon determining that the first key matches the second key.

Figure 12:
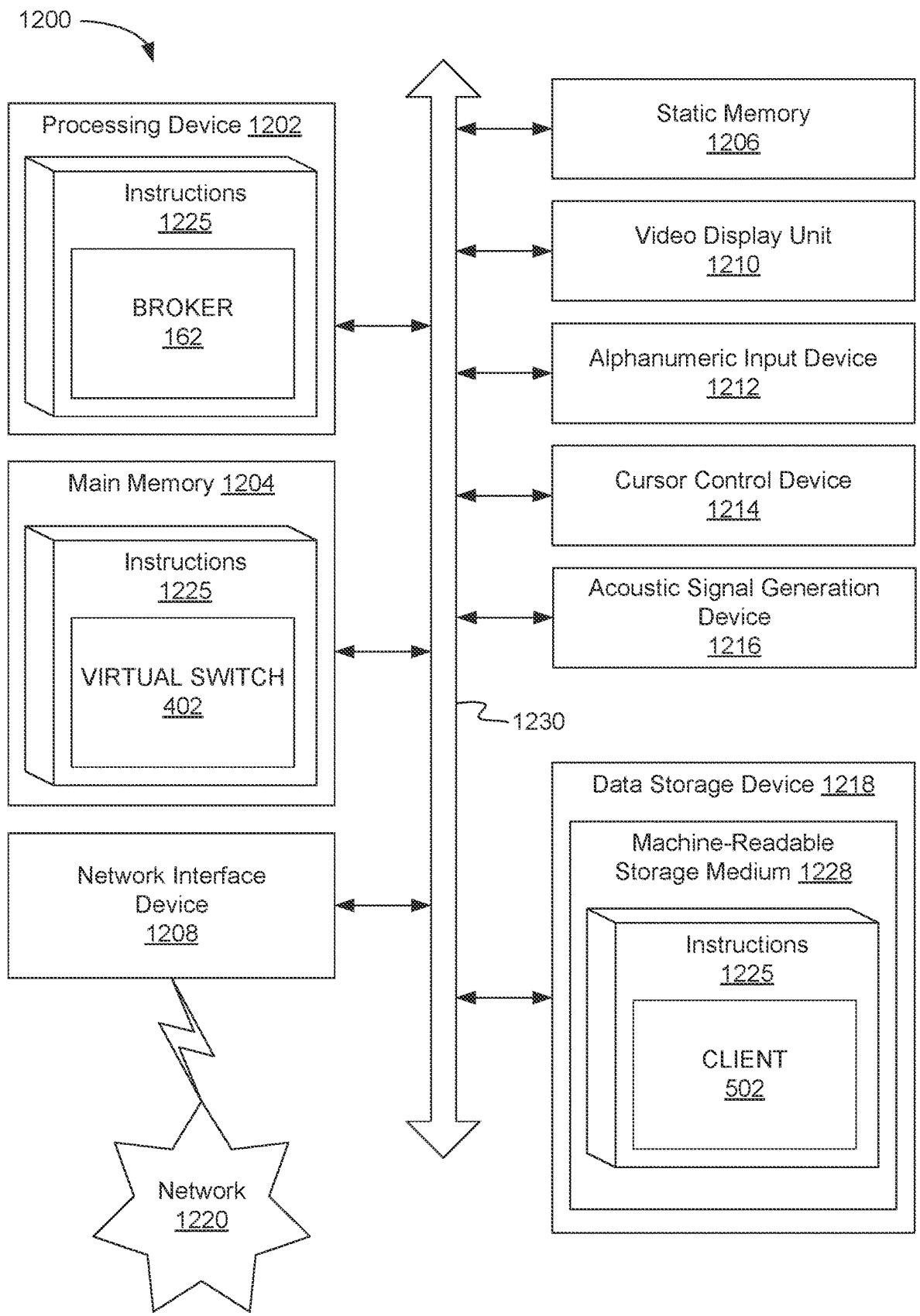
FIG. 12 is a block diagram of an example apparatus that may perform one or more of the operations described herein, in accordance with some embodiments of the present disclosure.

FIG. 12 is a block diagram of an example computing device 1200 that may perform one or more of the operations described herein, in accordance with some embodiments. Computing device 1200 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 1200 may include a processing device (e.g., a general purpose processor, a PLD, etc.) 1202, a main memory 1204 (e.g., synchronous dynamic random access memory (DRAM), read-only memory (ROM)), a static memory 1206 (e.g., flash memory and a data storage device 1218), which may communicate with each other via a bus 1230.

Processing device 1202 may be provided by one or more general-purpose processing devices such as a microprocessor, central processing unit, or the like. In an illustrative example, processing device 1202 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 1202 may also comprise one or more special-purpose processing devices such as an application specific integrated circuit (ASIC), a field programmable gate array (FPGA), a digital signal processor (DSP), network processor, or the like. The processing device 1202 may be configured to execute the operations described herein, in accordance with one or more aspects of the present disclosure, for performing the operations and steps discussed herein.

Computing device 1200 may further include a network interface device 1208 which may communicate with a network 1220. The computing device 1200 also may include a video display unit 1210 (e.g., a liquid crystal display (LCD) or a cathode ray tube (CRT)), an alphanumeric input device 1212 (e.g., a keyboard), a cursor control device 1214 (e.g., a mouse) and an acoustic signal generation device 1216 (e.g., a speaker). In one embodiment, video display unit 1210, alphanumeric input device 1212, and cursor control device 1214 may be combined into a single component or device (e.g., an LCD touch screen).

Data storage device 1218 may include a computer-readable storage medium 1228 on which may be stored one or more sets of instructions 1225 that may include instructions for a broker, e.g., broker 162, virtual switch, e.g., virtual switch 402, and/or a client, e.g., client 502 for carrying out the operations described herein, in accordance with one or more aspects of the present disclosure. Instructions 1225 may also reside, completely or at least partially, within main memory 1204 and/or within processing device 1202 during execution thereof by computing device 1200, main memory 1204 and processing device 1202 also constituting computer-readable media. The instructions 1225 may further be transmitted or received over a network 1220 via network interface device 1208.

While computer-readable storage medium 1228 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Example 1 is a method comprising: receiving, from a first client supported by a host system, a first request to establish a transport, the request comprising a first key; receiving, from a second client supported by the host system, a second request to establish the transport, the request comprising a second key; determining, by a processing device of the host system, whether the first key matches the second key; and in response to determining that the first key matches the second key, providing a first end point of the transport to the first client and a second end point of the transport to the second client.

Example 2 is the method of Example 1, wherein the first client comprises a virtual switch.

Example 3 is the method of any of Examples 1-2, wherein the first key is provided to the virtual switch with a command to generate a virtual port.

Example 4 is the method of any of Examples 1-3, wherein the second client comprises a virtual machine.

Example 5 is the method of any of Examples 1-4, wherein the second client comprises an application executing within a container.

Example 6 is the method of any of Examples 1-5, wherein the host system supports a plurality of clients and wherein a single socket is used to communicate with the plurality of clients.

Example 7 is the method of any of Examples 1-6, wherein the transport comprises a socket pair.

Example 8 is the method of any of Examples 1-7, wherein the transport supports transferring of file descriptors.

Example 9 is a system comprising: a memory; and a processing device, operatively coupled to the memory, to: receive a key for establishing a transport with a virtual switch; provide a request to establish the transport to a broker, the request comprising the key; and receive, from the broker, an end point for the transport, wherein a corresponding end point for the transport is received by the virtual switch.

Example 10 is the system of Example 9, wherein the broker is to determine whether the key matches a corresponding key provided by the virtual switch.

Example 11 is the system of any of Examples 9-10, wherein the one or more execution environments comprise one or more containers.

Example 12 is the system of any of Examples 9-11, wherein the key is received in response to an instantiation of a virtual machine.

Example 13 is the system of any of Examples 9-12, wherein the transport comprises a socket pair.

Example 14 is the system of any of Examples 9-13, wherein the transport supports transferring of file descriptors.

Example 15 is the system of any of Examples 9-14, wherein the processing device is further to: identify a disconnection with the broker; and provide a subsequent request to establish the transport to the broker, the request comprising the key.

Example 16 is the system of any of Examples 9-15, wherein the processing device is further to: transmit data to the virtual switch via the transport.

Example 17 is a non-transitory computer-readable storage medium including instructions that, when executed by a processing device, cause the processing device to: receive, by the processing device executing a virtual switch, a command to generate a virtual port, wherein the command comprises a first key associated with the virtual port; in response to receiving the command, generate the virtual port to facilitate network connectivity; transmit, to a broker, the key upon generating the virtual port; and receive, from the broker, an end point of a transport to facilitate communication with a client, wherein the client is associated with a second key that matches the first key.

Example 18 is the non-transitory computer-readable storage medium of Example 17, wherein the client comprises an application executing within a container.

Example 19 is the non-transitory computer-readable storage medium of any of Examples 17-18, wherein the client comprises a virtual machine.

Example 20 is the non-transitory computer-readable storage medium of any of Examples 17-19, wherein the transport comprises a socket pair.

Example 21 is the non-transitory computer-readable storage medium of any of Examples 17-20, wherein the transport supports transferring of file descriptors.

Example 22 is the non-transitory computer-readable storage medium of any of Examples 17-21, wherein the processing device is further to: identify a disconnection with the broker; and subsequently transmit the key to the broker.

Example 23 is the non-transitory computer-readable storage medium of any of Examples 17-22, wherein the virtual switch comprises a plurality of virtual ports, and wherein each of the plurality of virtual ports is associated with a corresponding key.

Example 24 is a method comprising: receiving, from a virtual switch, a first request to generate a connection between an execution environment and a virtual switch, the request comprising a first key; receiving a second request from the execution environment to generate the connection, the request comprising a second key; and generating, by a processing device, the connection between the execution environment and the virtual switch upon determining that the first key matches the second key.

Example 25 is the method of Example 24, further comprising: transmitting a command to generate a virtual port for the connection at the virtual switch; and providing the first key to the virtual switch.

Example 26 is the method of any of Examples 24-25, wherein the execution environment comprises a virtual machine.

Example 27 is the method of any of Examples 24-26, wherein the execution environment comprises an application executing within a container.

Example 28 is the method of any of Examples 24-27, wherein the connection comprises a socket pair.

Example 29 is the method of any of Examples 24-28, wherein the connection supports transferring of file descriptors.

Example 30 is the method of any of Examples 24-29, wherein generating the connection between the execution environment and the virtual switch comprises: providing a first end point of the connection to the virtual switch and a second end point of the transport to the execution environment.

Example 31 is an apparatus comprising: means for receiving, from a first client supported by a host system, a first request to establish a transport, the request comprising a first key; means for receiving, from a second client supported by the host system, a second request to establish the transport, the request comprising a second key; means for determining whether the first key matches the second key; and means for in response to determining that the first key matches the second key, providing a first end point of the transport to the first client and a second end point of the transport to the second client.

Example 32 is the apparatus of Example 31, wherein the first client comprises a virtual switch.

Example 33 is the apparatus of any of Examples 31-32, wherein the first key is provided to the virtual switch with a command to generate a virtual port.

Example 34 is the apparatus of any of Examples 31-33, wherein the second client comprises a virtual machine.

Example 35 is the apparatus of any of Examples 31-34, wherein the second client comprises an application executing within a container.

Example 36 is the apparatus of any of Examples 31-35, wherein the host system supports a plurality of clients and wherein a single socket is used to communicate with the plurality of clients.

Example 37 is the apparatus of any of Examples 31-36, wherein the transport comprises a socket pair.

Example 38 is the apparatus of any of Examples 31-37, wherein the transport supports transferring of file descriptors.

Unless specifically stated otherwise, terms such as "receiving," "configuring," "identifying," "transmitting," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method executed by a master host system, the method comprising:
   receiving, through a first network connection between the master host system and a first client of a plurality of clients, a first request from the first client to establish a transport between the first client and a second client of the plurality of clients, the first client comprising a virtual switch, and the first request comprising a first key of a virtual port generated by the virtual switch;
   receiving, through a second network connection between the master host system and the second client, a second request from the second client to establish the transport, the second request comprising a second key, wherein the second client is a slave of the master host system;
   in response to the first key matching the second key, providing, by a processing device of the master host system, a first end point of the transport to the first client and a second end point of the transport to the second client thereby establishing the transport; and
   in response to a disconnection of the second network connection, providing, by the processing device and to a broker of the master host system, a subsequent request to establish the transport using the second key without restarting the master host system, wherein the broker is executed by processing logic of the processing device to establish the transport.

2. The method of claim 1, wherein the virtual switch comprises multiple virtual ports each with a corresponding key for different execution environments of the master host system.

3. The method of claim 2, wherein the first key is provided to the virtual switch with a command to generate the virtual port.

4. The method of claim 1, wherein the second client comprises a virtual machine.

5. The method of claim 1, wherein the second client comprises an application executing within a container.

6. The method of claim 1, wherein the master host system uses a single socket created by the broker to communicate with the plurality of clients.

7. The method of claim 1, wherein the transport comprises a socket pair.

8. The method of claim 1, wherein the transport supports transferring of file descriptors.

9. A master host system comprising:
a memory; and
a processing device, operatively coupled to the memory, to:
receive, through a first network connection between the master host system and a first client of a plurality of clients, a first request from the first client to establish a transport between the first client and a second client of the plurality of clients, the first client comprising a virtual switch, and the first request comprising a first key of a virtual port generated by the virtual switch;
receive, through a second network connection between the master host system and the second client, a second request from the second client to establish the transport, the second request comprising a second key, wherein the second client is a slave of the master host system;
in response to the first key matching the second key, provide a first end point of the transport to the first client and a second end point of the transport to the second client thereby establishing the transport; and
in response to a disconnection of the second network connection, provide a subsequent request to a broker of the master host system to establish the transport using the second key without restarting the master host system, wherein the broker is executed by processing logic of the processing device to establish the transport.

10. The master host system of claim 9, wherein the virtual switch comprises multiple virtual ports each with a corresponding key for different execution environments of the master host system.

11. The master host system of claim 10, wherein the first key is provided to the virtual switch with a command to generate the virtual port.

12. The master host system of claim 9, wherein the second client comprises a virtual machine.

13. The master host system of claim 9, wherein the second client comprises an application executing within a container.

14. The master host system of claim 9, wherein the master host system uses a single socket created by the broker to communicate with the plurality of clients.

15. The master host system of claim 9, wherein the transport comprises a socket pair.

16. The master host system of claim 9, wherein the transport supports transferring of file descriptors.

17. A non-transitory computer-readable storage medium including instructions that, when executed by a processing device of a master host system, cause the processing device to:
receive, through a first network connection between the master host system and a first client of a plurality of clients, a first request from the first client to establish a transport between the first client and a second client of the plurality of clients, the first client comprising a virtual switch, and the first request comprising a first key of a virtual port generating by the virtual switch;
receive, through a second network connection between the master host system and the second client, a second request from the second client to establish the transport, the second request comprising a second key, wherein the second client is a slave of the master host system;
in response to the first key matching the second key, provide a first end point of the transport to the first client and a second end point of the transport to the second client thereby establishing the transport; and
in response to a disconnection of the second network connection, provide, to a broker of the master host system, a subsequent request to establish the transport using the second key without restarting the master host system, wherein the broker is executed by processing logic of the processing device to establish the transport.

18. The non-transitory computer-readable storage medium of claim 17, wherein the virtual switch comprises multiple virtual ports each with a corresponding key for different execution environments of the master host system.

19. The non-transitory computer-readable storage medium of claim 17, wherein the first key is provided to the virtual switch with a command to generate the virtual port.

20. The non-transitory computer-readable storage medium of claim 17, wherein the second client comprises a virtual machine.

* * * * *